(12) United States Patent
Shouno

(10) Patent No.: US 8,599,417 B2
(45) Date of Patent: Dec. 3, 2013

(54) SYSTEM AND METHOD FOR SETTING NETWORK ADDRESS

(75) Inventor: Hiroki Shouno, Kawasaki (JP)

(73) Assignee: Canon Kabushiki Kaisha, Toyko (JP)

( * ) Notice: Subject to any disclaimer, the term of this patent is extended or adjusted under 35 U.S.C. 154(b) by 0 days.

(21) Appl. No.: 13/481,646

(22) Filed: May 25, 2012

(65) Prior Publication Data

US 2012/0235943 A1 Sep. 20, 2012

Related U.S. Application Data

(63) Continuation of application No. 11/851,699, filed on Sep. 7, 2007, now Pat. No. 8,208,155.

(30) Foreign Application Priority Data

Sep. 8, 2006 (JP) ................................. 2006-244833

(51) Int. Cl.
*G06F 3/12* (2006.01)
*G06F 15/16* (2006.01)

(52) U.S. Cl.
USPC ........................... 358/1.15; 709/223; 709/245

(58) Field of Classification Search
None
See application file for complete search history.

(56) References Cited

U.S. PATENT DOCUMENTS

| 7,194,552 B1* | 3/2007 | Schneider ...................... 709/245 |
| 2004/0088073 A1* | 5/2004 | Yamazaki et al. ............ 700/200 |
| 2005/0058487 A1* | 3/2005 | Utsubo ........................... 400/76 |
| 2005/0108547 A1* | 5/2005 | Sakai ............................ 713/182 |
| 2005/0140659 A1* | 6/2005 | Hohl et al. ..................... 345/169 |
| 2006/0067343 A1* | 3/2006 | Tagawa et al. ................ 370/401 |
| 2006/0067495 A1* | 3/2006 | Otsuka ..................... 379/142.01 |
| 2006/0279775 A1* | 12/2006 | Matsumoto et al. ......... 358/1.15 |

* cited by examiner

*Primary Examiner* — Vincent Rudolph
(74) *Attorney, Agent, or Firm* — Canon USA Inc IP Division

(57) ABSTRACT

A network apparatus configured to perform data communication using an address includes a value input unit configured to input a value describing at least one part of the address, a first mark input unit configured to input a mark for separating a plurality of values describing the address in a plurality of parts, and a second mark input unit configured to continuously input a plurality of marks.

10 Claims, 12 Drawing Sheets

SYSTEM AND METHOD FOR SETTING NETWORK ADDRESS

CROSS-REFERENCE TO RELATED APPLICATIONS

This application is a continuation application of U.S. Ser. No. 11/851,699 filed Sep. 7, 2007 which claims priority to Japanese Application Serial No. 2006-244833, filed Sep. 8, 2006, all of which the contents of are hereby incorporated by reference in their entirety.

BACKGROUND OF THE INVENTION

1. Field of the Invention

The present invention relates to setting an address of a network apparatus. More specifically, the present invention relates to a network apparatus, a method for performing a setting via the network apparatus, a program, and a storage medium that enable setting of an address utilizing a specific mark.

2. Description of the Related Art

In recent years, it is characteristic of a network apparatus that uses a communication method to support an Internet Protocol Version 6 (IPv6) function. IPv6 is a protocol presently regarded as a next-generation version of an Internet Protocol (IP), which is a standard communication protocol used in a wide area network (WAN) (e.g., the Internet) or a local area network (LAN) in a business office.

IPv6 can handle a larger number of IP addresses than previous protocols, such as IPv4. In this regard, a presently used standard IP (according to IPv4) has an IP address size of 32 bits. That is, in a standard IP, the total number of addresses is limited to $2^{32}$.

However, with a rapidly expanding use of network apparatuses, possible exhaustion of IP addresses is becoming a significant issue.

As is well known to persons skilled in the art, addresses in IPv6 are 128 bits long, as defined by the Network Working Group Request for Comments (NWG/RFC) 4291. That is, the total number of addresses in IPv6 can be increased to as many as $2^{128}$. With IPv6 having such large number of available addresses, the problem of exhaustion of addresses is addressed. Accordingly, recently, more and more network apparatus products support an IPv6 function as their standard, as in an apparatus discussed in Japanese Patent Application Laid-Open No. 2004-350133.

As described above, addresses in IPv6 are 128 bits long. An IPv6 address is generally notated by hexadecimal notation using a colon (":") mark, as in the following.

"1111:2222:3333:4444:5555:AAAA:BBBB:CCCC"

That is, in notating an IPv6 address, a 128-bit long address is divided into a plurality of groups of digits in units of 16 bits, using a colon (":") mark as a separator. Hereinbelow, a group of digits divided per 16 bits is referred to as a "field".

An IPv6 address includes eight fields. It is regulated that digits in the 16-bit field are notated according to hexadecimal notation.

An IPv6 address is notated as described above. However, since a large number of digits are used in an IPv6 address, an IPv6 can be notated in abbreviation according to specific abbreviation regulations.

Firs, leading zeros in units of a byte in each 16-bit field can be omitted. For example, an IPv6 address that is notated as "1111:0222:0033:0004:5555:AAAA:BBBB:CCCC", can be notated in abbreviation as "1111:222:33:4:5555:AAAA:BBBB:CCCC".

Second, if one or more field (s) is "0000", the zeros can be omitted and replaced with two colons ("::"). For example, an IPv6 address "1111:2222:0:0:0:AAAA:BBBB:CCCC" can be shortened to "1111:2222::AAAA:BBBB:CCCC".

The abbreviating notation of a field including zeros can be used only once in one IPv6 address. For example, an IPv6 address "1111:0:0:0:5555:0:0:CCCC", which includes two "0" fields, can be notated in abbreviation as either "1111::5555:0:0:CCCC" or "1111:0:0:0:5555::CCCC".

As described above, in notating an IPv6 address, zeros in adjacent 16-bit fields can be abbreviated with colons ("::"). However, in setting an IPv6 address using abbreviation marks, the following problems can arise.

In inputting an IPv6 address of a network apparatus or a domain name system (DNS) server, or in inputting an IPv6 address during performing a setting for IP filtering, a user of a network apparatus generally uses a software keyboard or numeric keypads. In this case, in inputting digits for an address notated by abbreviating adjacent zeros in its field(s) using colons ("::"), a user of a network apparatus can experience difficulties entered this information on a touch panel.

A user, in inputting colons ("::") via a software keyboard, presses an existing colon button (a button that enables the user to input a colon (":")) twice. However, in the case of a touch panel, in pressing the same button twice or more, it is typically necessary for the user to press the button at a sufficient time interval to correctly and properly input desired digits or marks.

Accordingly, when the user believes two colons ("::") have been correctly input, the touch panel may not correctly recognize the user's instruction. As such, it is necessary for the user, in pressing a colon button twice, to pay attention to press the button at a specific time interval. Thus, the user can feel very uncomfortable during performing setting.

In this regard, it is possible that a graphic user interface (GUI) that does not require a user to press a key (colon) multiple times and continuously input the entire 128 bits while an input form is divided in the unit of 16 bits could allow a user to input digits and marks per 16-bit field. However, such a GUI can restrict an address expression by the user.

That is, when a user without an extensive network protocol knowledge, i.e., a user who does not know the abbreviation regulations for the notation of an IPv6 address, desires to input an IPv6 address notated in abbreviation on a GUI as it is, the user can not easily know how to input the address according to the input form.

SUMMARY OF THE INVENTION

The present invention is directed to a method for inputting an address in a simple manner using a specific mark.

According to an aspect of the present invention, a network apparatus configured to perform data communication using an address includes a value input unit configured to input a value describing at least one part of the address, a first mark input unit configured to input a mark for separating a plurality of values describing the address in a plurality of parts, and a second mark input unit configured to continuously input a plurality of marks.

According to another aspect of the present invention, a network apparatus configured to perform data communication using an address includes a value input unit configured to input a value describing at least one part of the address, and a mark input unit configured to input a mark indicating that a plurality of specific values entered via the value input unit continuously exist in the address.

According to yet another aspect of the present invention, a method for a network apparatus to perform data communication using an address includes inputting a value describing at least one part of the address via a first key of the network apparatus, inputting a mark for separating a plurality of values describing the address in a plurality of parts via a second key of the network apparatus, and continuously inputting a plurality of marks via a third key of the network apparatus.

According to yet another aspect of the present invention, a method for a network apparatus to perform data communication using an address includes inputting a value describing at least one part of the address via one of a plurality of keys of the network apparatus, and inputting a mark indicating that a plurality of specific values describing at least one part of the address continuously exist via a first key of the network apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Figure 1:
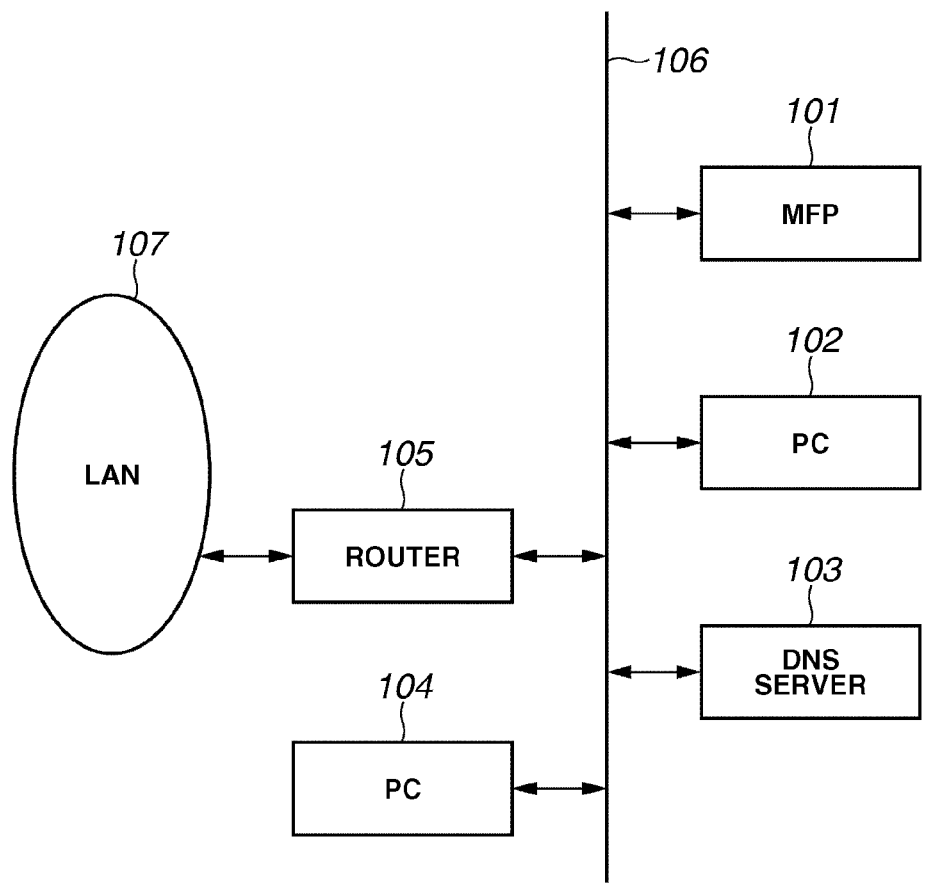
FIG. 1 illustrates an exemplary configuration of a network to which a network apparatus according to a first exemplary embodiment of the present invention is connected.

FIG. 1 illustrates an exemplary configuration of the entire system including a network apparatus according to the first exemplary embodiment.

Referring to FIG. 1, a LAN 106 used as a network in a user environment can be Ethernet®. Apparatuses that can communicate with one another via a network having a plurality of network interfaces are connected to the LAN 106.

A multifunction peripheral (MFP) 101 is a network apparatus according to a first exemplary embodiment of the present invention. The MFP 101 includes at least a print function and a scan function. A personal computer (PC) 102 and a PC 104 are general personal computers.

Figure 2:
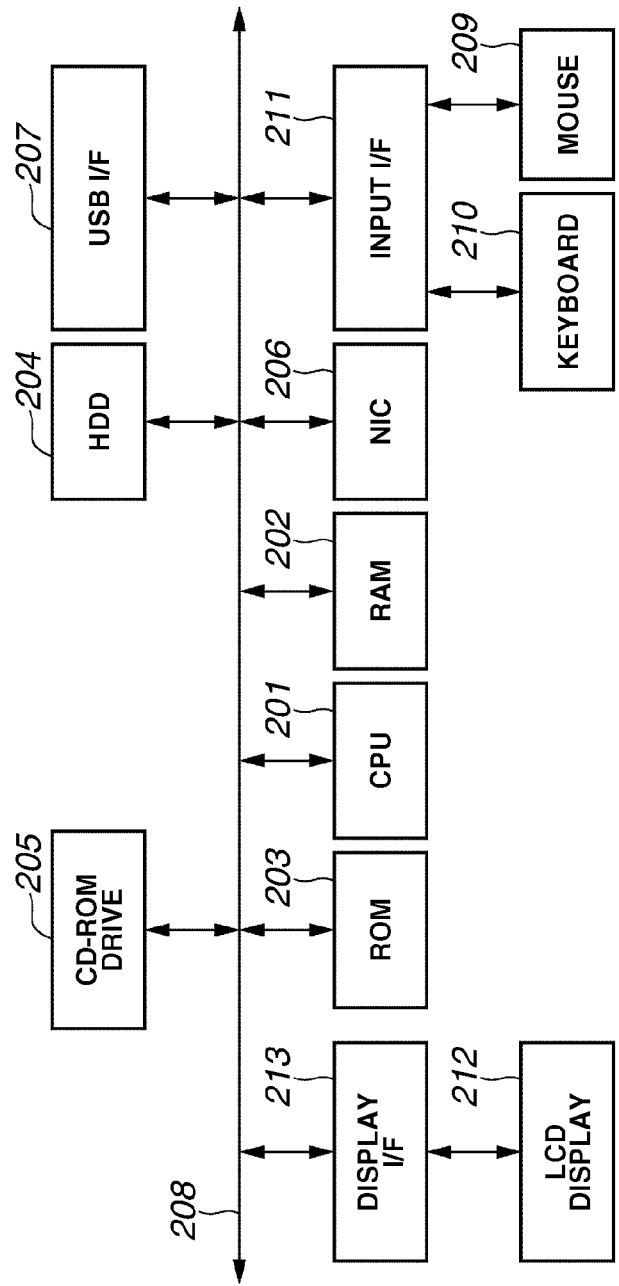
FIG. 2 illustrates a hardware configuration of a personal computer according to the first exemplary embodiment of the present invention.

FIG. 2 illustrates an exemplary hardware configuration of PC 102 and PC 104.

Referring to FIG. 2, the PC 102 and the PC 104 include a central processing unit (CPU) 201 as a computation unit. Furthermore, the PC 102 and the PC 104 include a random access memory (RAM) 202, a read-only memory (ROM) 203, and a hard disk drive (HDD) 204 as storage devices. In addition, the PC 102 and the PC 104 include a compact disk-read only memory (CD-ROM) drive 205 as an external storage device.

The PC 102 and the PC 104 include a network interface card (NIC) 206 and a universal serial bus (USB) host interface 207 as external interfaces. The CPU 201, the RAM 202, the ROM 203, the HDD 204, the CD-ROM drive 205, the NIC 206, the USB host interface 207, and peripheral apparatuses described below are in communication with one another via a bus 208.

A mouse 209 and a keyboard 210 are connected to the PC 102 and the PC 104 via an input interface as peripheral devices. In addition, a liquid crystal display (LCD) 212 is connected to the PC 102 and the PC 104 via a display interface 213.

Various software programs are installed on the PC 102 and the PC 104. That is, the PC 102 and the PC 104 include an operating system (OS), office software application programs such as a word processor and a spreadsheet, and an e-mail client software program. The OS includes a port monitoring function for sending print data to a printer (not illustrated) or the MFP 101 via the LAN (network) 106. The PC 102 and the PC 104 can perform data communication according to IPv6.

Turning back to FIG. 1, a DNS server 103 can perform DNS communication according to IPv6. The DNS server 103 includes a name table including a AAAA record as well as an A record. Thus, the DNS server 103 can hold information including an IPv6 address and a host name associated with each other.

A router 105 includes a function for routing between the LAN 106 and a LAN 107 according to IPv6. The LAN 107 can be used for data communication according to IPv6.

Figure 3:
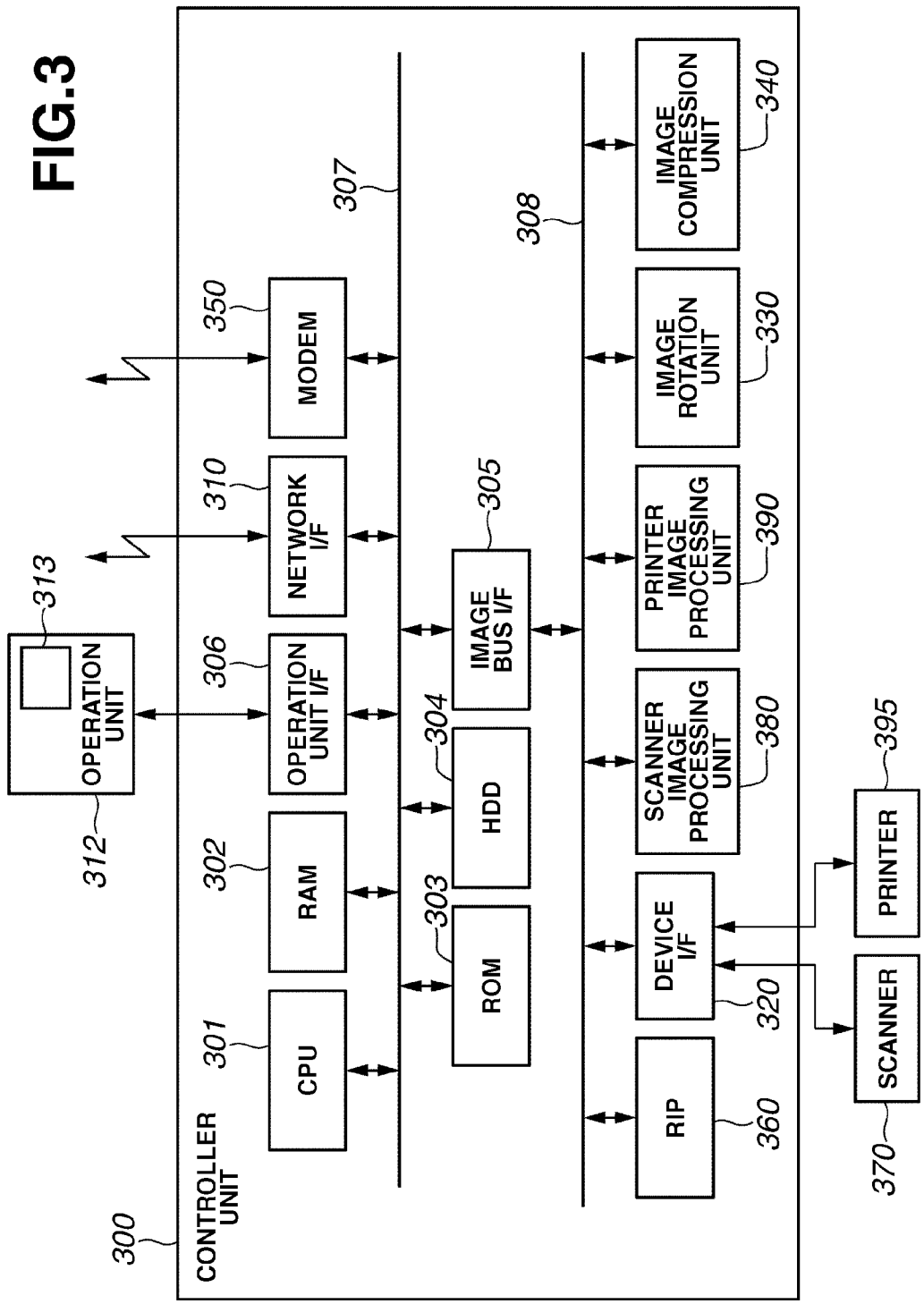
FIG. 3 illustrates a system configuration of a multifunction peripheral (MFP) that is a network apparatus according to the first exemplary embodiment of the present invention.

FIG. 3 illustrates main components of the MFP 101 according to the present embodiment of the present invention.

Referring to FIG. 3, a scanner (image input device) 370 and a printer (image output device) 395 are connected to a controller unit 300. The controller unit 300 performs control to implement a copy function for printing out with the printer 395 image data read by the scanner 370. Furthermore, the controller unit 300 is connected to the LAN 106. Thus, the controller unit 300 performs control for inputting and outputting image information and device information.

The controller unit 300 includes a CPU 301. The CPU 301 executes a boot program stored on a ROM 303 to activate the OS. The CPU 301 executes on the OS an application program stored on an HDD 304 to perform various processing. The HDD 304 stores the application program and image data.

A RAM 302 serves as a work area for the CPU 301. The RAM 302 serves as a work area for the CPU 301 and as an image memory for temporarily storing image data.

An operation unit I/F 306, a network I/F 310, a modem 350, and an image bus I/F 305 are connected to the CPU 301 via a system bus 307.

The operation unit I/F 306 is an interface between the controller unit 300 and an operation unit 312 having a touch panel. Image data to be displayed on an LCD display unit 313 of the operation unit 312 is output to the operation unit 312 via the operation unit I/F 306. Furthermore, information input by the user via the operation unit 312 is sent to the CPU 301 via the operation unit I/F 306.

The network I/F 310 is connected to the LAN 106. Thus, the controller unit 300 can perform data communication with each apparatus on the LAN 106, via the LAN 106. The modem 350 is connected to a public line (e.g., a wide area network (WAND)) (not illustrated). Thus, the controller unit 300 can perform data communication with an apparatus connected via the public line. The image bus I/F 305 is a bus bridge for converting a data structure provided between the system bus 307 and an image bus 308 for transferring image data at a high speed.

The image bus 308 is constituted by a peripheral component interconnect (PCI) bus or an Institute of Electrical and Electronic Engineers (IEEE) 1394 bus. A raster image processor (RIP) 360, a device I/F 320, a scanner image processing unit 380, a printer image processing unit 390, an image rotation unit 330, and an image compression/decompression unit 340 are in communication with one another via the image bus 308.

The RIP 360 is a processor for rasterizing a page description language (PDL) code into a bitmap image. The scanner 370 and the printer 395 are connected to the device I/F 320. The device I/F 320 performs conversion between synchronous image data and asynchronous image data.

The scanner image processing unit 380 corrects, processes, and edits input image data. The printer image processing unit 390 performs correction and resolution conversion on image data to be printed out. The image rotation unit 330 rotates image data. The image compression/decompression unit 340 compresses multivalued image data into Joint Photographic Experts Group (JPEG) data and binary image data into Joint Bi-level Image Experts Group (JBIG) data, Modified Modified Read (MMR) data, or Modified Huffman (MH) data. The image compression unit 340 also decompresses the JPEG, JBIG, MMR, or MH data.

Figure 4:
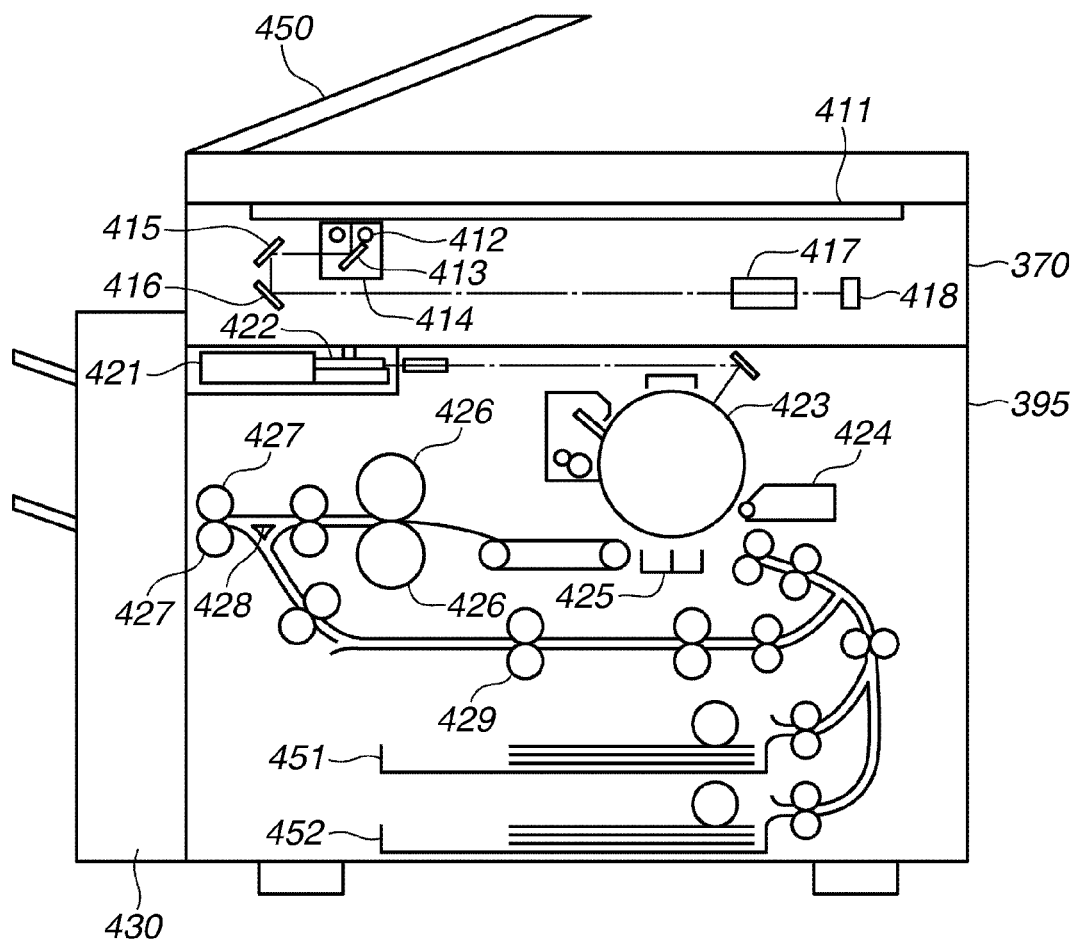
FIG. 4 illustrates a hardware configuration of the MFP that is a network apparatus according to the first exemplary embodiment of the present invention.

FIG. 4 illustrates exemplary hardware configurations of the scanner 370 and the printer 395 of the MFP 101. In the present embodiment, the scanner 370 and the printer 395 are integrally configured.

Referring to FIG. 4, the user places a document onto a platen glass (document table) 411 of the scanner 370 and puts a cover 450 on the document. Then, the user presses a scan start button (not illustrated), which results in a lamp 412 being lit and a moving unit 413 moving. The moving unit 413 moves to read and scan the document placed on the platen glass 411.

During the reading and scanning operation, light reflected from the document is guided to a charge-coupled device (CCD) image sensor (hereinafter simply referred to as a "CCD") 418 via mirrors 414, 415, and 416 and a lens 417. Thus, an image of the document is formed on an imaging surface of the CCD 418. The CCD 418 converts the image formed on its imaging surface into an electric signal. The electric signal is input to the controller unit 300 after being subjected to predetermined processing.

The printer 395 includes a laser driver 421. The laser driver 421 drives a laser light emission unit 422 according to image data input from the controller unit 300. Thus, the laser light emission unit 422 emits a laser beam according to the image data. The laser beam emitted from the laser light emission unit 422 is irradiated on a surface of a photosensitive drum 423 while being scanned.

An electrostatic latent image is formed on the photosensitive drum 423 by the irradiated laser beam. The electrostatic latent image is visualized as a toner image using a toner supplied from a development unit 424. In synchronization with a timing of irradiation with the laser light, a recording paper is fed from cassettes 451 or 452 to a portion between the photosensitive drum 423 and a transfer unit 425. The toner image formed on the photosensitive drum 423 is transferred onto the fed recording paper by the transfer unit 425.

The recording paper having the transferred toner image is conveyed to a fixing roller pair (a heat roller and a pressure roller) 426 via a conveyance belt. The fixing roller pair 426 applies heat and pressure to the conveyed recording paper to fix the toner image on the recording paper. The recording paper, having passed the fixing roller pair 426, is discharged onto a paper discharge unit 430 by a discharge roller pair 427.

The paper discharge unit 430 includes a sheet processing apparatus capable of performing post-processing such as sorting and stapling. In the case where a two-sided recording mode has been set by the user, after the recording paper is conveyed to the discharge roller pair 427, the discharge roller pair 427 rotates in a reverse direction to guide the recording paper to a refeed conveyance path 429 using a flapper 428.

The recording paper guided into the refeed conveyance path 429 is then refed to a portion between the photosensitive drum 423 and the transfer unit 425 at the above-described timing. At this time, a toner image is transferred onto a backside of the recording paper.

Figure 5:
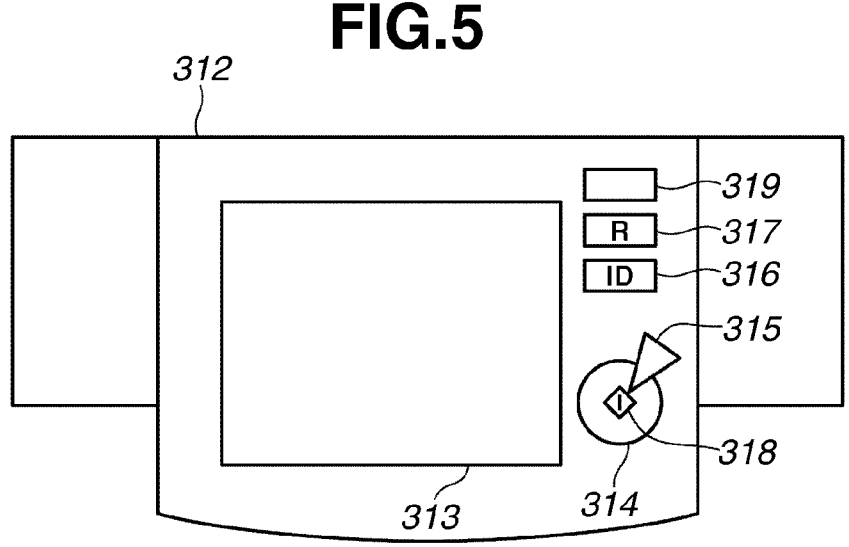
FIG. 5 illustrates a hardware configuration of an operation unit of the MFP that is a network apparatus according to the first exemplary embodiment of the present invention.

FIG. 5 illustrates an example of an external appearance of the operation unit 312 according to the present exemplary embodiment.

Referring to FIG. 5, the LCD display unit 313 is provided with a touch panel sheet on its LCD. The LCD display unit 313 displays an operation screen for the MFP 101. When the user selects a key displayed on the LCD of the LCD display unit 313, the LCD display unit 313 sends positional information of the selected key to the CPU 301. A start key 314 enables the user to start reading of a document image. In a center portion of the start key 314, green and red colored light-emitting diodes (LEDs) 318 are provided. The color of the LEDs 318 indicates whether the start key 314 is in an operable state.

A stop key 315 enables the user to stop the operation currently performed by the MFP 101. An ID key 316 enables the user to enter a user identification (ID) uniquely defined for the user. A reset key 317 enables the user to reset a setting performed by the user via the operation unit 312 to a default setting. A mode setting key 319 enables the user to start a mode for performing various settings for the MFP 101.

Figure 6:
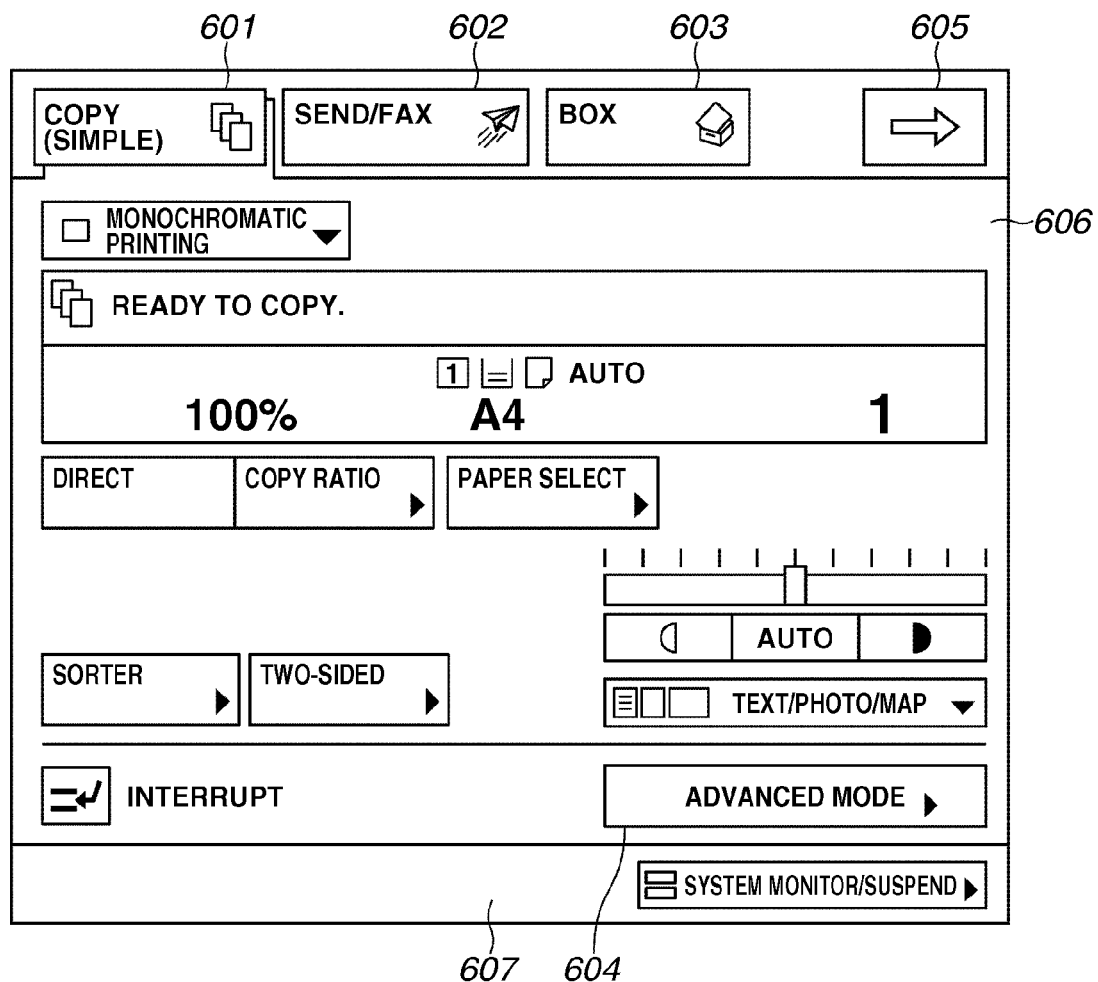
FIG. 6 illustrates a GUI screen displayed an operation unit of the MFP that is a network apparatus according to the first exemplary embodiment of the present invention.

FIG. 6 illustrates an exemplary GUI operation screen displayed on the LCD display unit 313 of the operation unit 312 according to the present embodiment. Referring to FIG. 6, in an upper portion of the GUI operation screen, touch keys displayed as tabs for a plurality of functions, such as a copy tab 601, a send/fax tab 602, and a box tab 603, are displayed. In the case where the controller unit 300 includes five or more functions, a right arrow key 605 is displayed to the right of the above-described function tabs.

The example in FIG. 6 illustrates a default GUI screen for the copy function displayed when the user has selected the copy tab 601.

Various information about the copy function is displayed in a field 606. In an upper part of the field 606, a copy function operation status (a field indicating a message "Ready to Copy." in FIG. 6) is displayed. Below this part of the field 606, fields for designating a copy ratio, a paper cassette to be selected, and a number of copies to make are displayed. In addition, touch keys for setting an operation mode for the copy function, such as a "direct" key, a "copy ratio" key, a "paper select" key, a "sorter" key, a "two-sided" key, an "interrupt" key, a "text" key, and keys for adjusting density, are displayed.

In the case of designating operation modes that cannot be displayed on the default GUI screen, the user can select an "advanced mode" key 604. When the user selects the "advanced mode" key 604, a GUI screen for designating advanced modes in hierarchical order is displayed in the field 606.

A display field 607 displays an operation status of the MFP 101. In the display field 607, for example, an alarm (warning) message indicating paper jamming or a status message indicating that a specific operation such as PDL printing is currently performed, is displayed.

Figure 7:
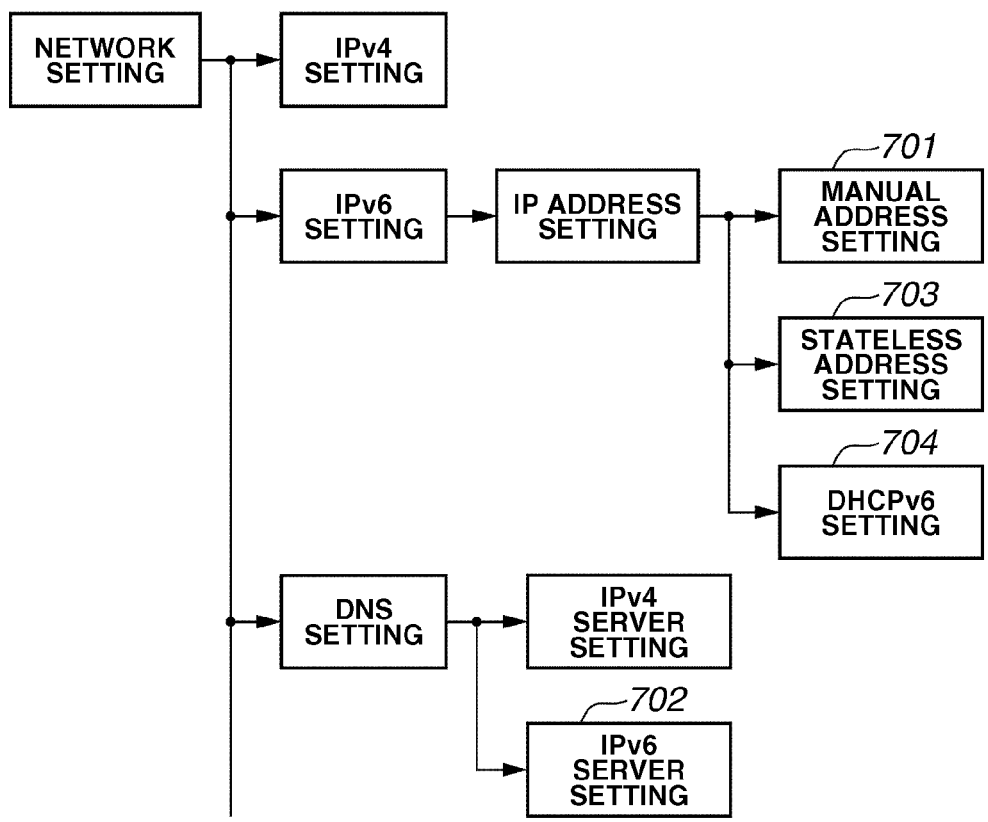
FIG. 7 illustrates a tree structure of functions for performing a network setting of the MFP that is a network apparatus according to the first exemplary embodiment of the present invention.

FIG. 7 illustrates an example of a tree structure of menus for network settings displayed on the LCD display unit 313 of the operation unit 312 when the user selects the mode setting key 319 (FIG. 5) according to the present embodiment. A program for performing network setting for the MFP 101 is previously stored on the HDD 304.

Referring to FIG. 7, when the user selects the mode setting key 319, a menu for performing various settings on the MFP 101 is displayed on the LCD display unit 313.

When the user selects network setting via the screen displayed on the LCD display unit 313, a menu for performing network setting is displayed. As illustrated in FIG. 7, menus for performing network setting are tree-structured.

A manual address setting menu 701 enables the user to shift the screen to a user interface (UI) screen for performing setting for manually inputting an IPv6 address of the MFP 101. The manual address setting menu 701 is positioned at an end of the tree structure described below. That is, the menu shifts from a network setting menu, to an IPv6 setting menu, then to an IP address setting menu, and then to the manual address setting menu 701.

The user of the MFP 101 can shift between the menus in the tree structure by selecting any one of the touch keys displayed on the LCD display unit 313 of the operation unit 312, to perform a setting via a desired menu.

A plurality of IPv6 addresses can be provided to the MFP 101. Furthermore, a plurality of methods for generating an address is provided to the MFP 101. The manual address setting menu 701 is a menu related to a function for performing a setting in which the user allocates an IPv6 address to the MFP 101. The user enters an IPv6 address via the manual address setting menu 701.

A stateless address setting menu 703 is a menu related to a function for receiving an Internet control message protocol (ICMP) message called "router advertise" (RA) from the router 105, to internally and automatically generate an IPv6 address within the MFP 101.

A Dynamic Host Configuration Protocol version 6 (DHCPv6) setting menu 704 is a menu related to a function for receiving information from a DHCPv6 server using DHCPv6, to automatically generate an IPv6 address according to the received information. The MFP 101 supports these functions.

Figure 8:
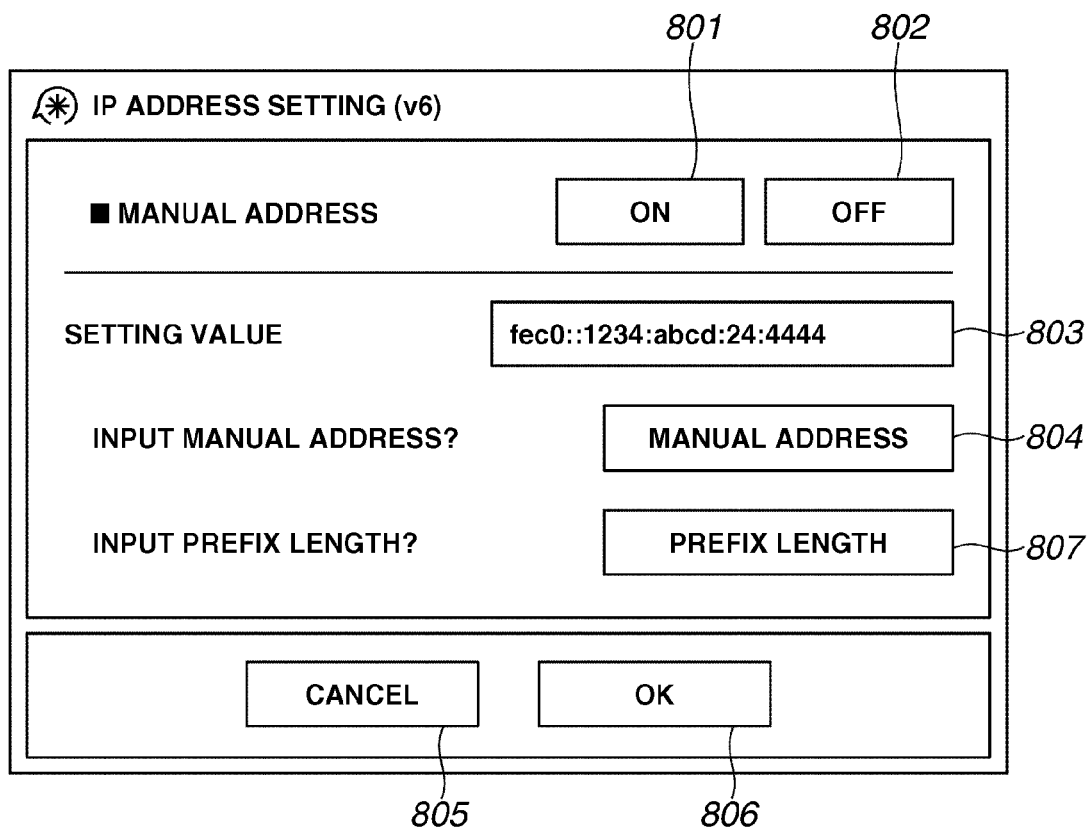
FIG. 8 illustrates a GUI screen for performing a setting for manually inputting an IPv6 address according to the first exemplary embodiment of the present invention.

FIG. 8 illustrates an exemplary GUI screen for performing a setting for manually inputting an IPv6 address. When the user selects the manual address setting 701, the screen displayed on the LCD display unit 313 of the operation unit 312 shifts to the GUI screen illustrated in FIG. 8. Referring to FIG. 8, touch keys 801 and 802 enable the user to select whether to make effective the manually set IPv6 address (manual IPv6 address).

If the user selects the touch key 801, the MFP 101 performs IPv6 communication using the manually set IPv6 address. On the other hand, if the user selects the touch key 802, then the MFP 101 does not perform IPv6 communication using the manually set IPv6 address.

A setting value display field 803 displays the manual IP address set to the MFP 101. If the MFP 101 is in a factory default state, that is, if no IPv6 address is set to the MFP 101, the setting value display field 803 does not display an IPv6 address.

A touch key 804 enables the user to shift to a screen for setting a manual IPv6 address. A touch key 805 is a cancel key. When the user selects the touch key 805, the menu shifts to a higher-order menu without holding the RAM 302 information about a change in the setting made via the GUI screen for manually inputting an IPv6 address.

A touch key 806 is an OK key. When the user selects the touch key 806, the menu shifts to a higher-order menu after holding in a specific area of the RAM 302 information about a change in the setting made via the GUI screen for manually inputting an IPv6 address. A touch key 807 enables the user to shift to a GUI screen for manually setting a default router address.

Figure 9:
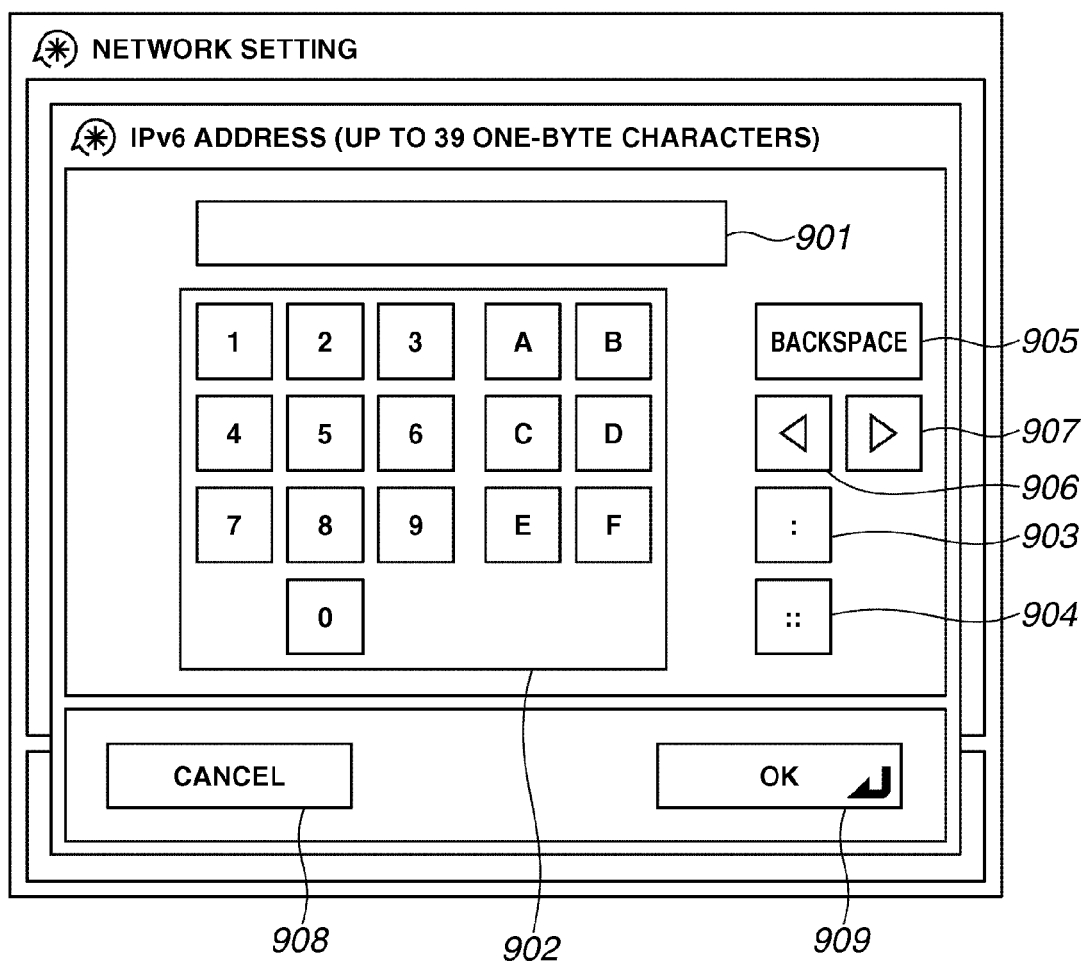
FIG. 9 illustrates a GUI screen for setting an IPv6 address according to the first exemplary embodiment of the present invention.

FIG. 9 illustrates an example of a GUI screen for setting a manual IPv6 address. When the user selects the touch key 804, the screen on the LCD display unit 313 of the operation unit 312 shifts to the GUI screen illustrated in FIG. 9. Referring to FIG. 9, an input field 901 is an input form for inputting an IPv6 address. When the user enters an IPv6 address, the entered IPv6 address is displayed in the input field 901. The user enters digits for describing an IPv6 address having a colon(s) notated by hexadecimal notation in the input field 901.

Touch keys 902 enable the user to input an address. The touch keys 902 include numerical keys (e.g., "0" through "9" and alphabetical keys (e.g., "A" through "F", which represent the IPv6 address. The user enters digits for describing an IPv6 address by selecting the touch keys 902.

A touch key 903 enables the user to enter a mark (hereinafter referred to as a "colon (":")") that is a separator between fields of an IPv6 address. When the user desires to input a colon (":") and selects the touch key 903, a colon (":") is displayed in the input field 901, which indicates that the colon (":") has been properly entered.

A touch key 904 enables the user, in the case where one field of an IPv6 address includes only zeros, to abbreviate the zeros. Furthermore, in the case where more than one field includes only zeros, the user can enter an abbreviation mark (hereinafter referred to as "colons ("::")") by selecting the touch key 904 to abbreviate the zeros and the colon (":"). When the user desires to enter colons ("::") in entering an IPv6 address, the user can select the touch key 904. In this case, the input field 901 displays the colons ("::"), which indicates that the colons ("::") have been properly entered.

A touch key 905 is a backspace key. The touch key 905 enables the user to delete one digit of an IPv6 address entered in the input field 901. If no digit has been entered in the input field 901, if the user selects the touch key 905, no operation is performed.

Touch keys 906 and 907 are shift keys that enable the user to shift between input fields in the input field 901. A touch key 908 is a cancel key. When the user selects the touch key 908, the screen shifts to a higher-order menu without holding the RAM 302 information about changes in the setting for a manual IPv6 address made by the user via the GUI screen in FIG. 9.

A touch key 909 is an OK key. When the user selects the touch key 909, the screen shifts to a higher-order menu after holding the RAM 302 information about changes in the setting for a manual IPv6 address made by the user via the GUI screen in FIG. 9.

Figure 10:
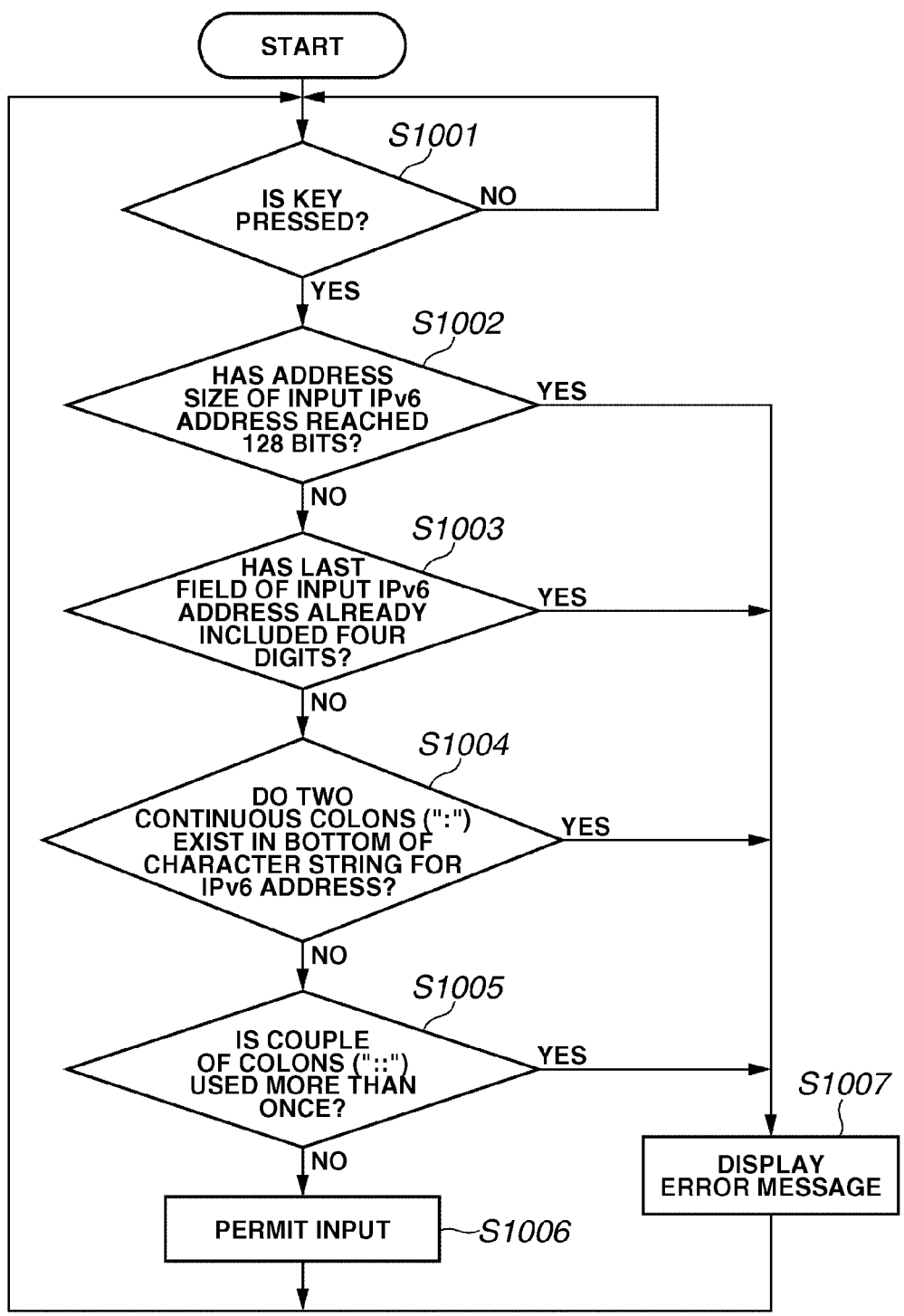
FIG. 10 is a flow chart illustrating processing performed by a network apparatus according to the first exemplary embodiment of the present invention.

FIG. 10 is a flow chart illustrating processing for detecting an operation inhibited in entering an IPv6 address according to the present embodiment.

When the user selects either the touch keys 902, the touch key 903, or the touch key 904, desired digits are entered and the entered digits are displayed in the input field 901. If the entered digit string does not conform to a specific regulation for entering an IPv6 address, the CPU 301 of the controller unit 300 issues a warning message to the user indicating that the current operation is inhibited.

Referring to FIG. 10, after the processing for detecting an inhibited operation starts, in step S1001, the CPU 301 waits until the user selects a desired key. If it is detected in step S1001 that either the touch keys 902, the touch key 903, or the touch key 904 has been selected by the user (Yes in step S1001), then the CPU 301 advances to step S1002. In step S1002, the CPU 301 evaluates an address size. That is, in step S1002, the CPU 301 detects whether an address size of the entered IPv6 address has already reached 128 bits.

As described above, an IPv6 address is 128 bits long. Accordingly, if it is detected in step S1002 that the address size of the entered IPv6 address has already reached 128 bits (Yes in step S1002), the process advances to step S1007. In step S1007, the CPU 301 notifies an error to the user. On the other hand, if it is detected in step S1002 that the address size of the entered IPv6 address has not reached 128 bits yet (No in step S1002), then the process advances to step S1003.

In step S1003, the CPU 301 evaluates continuous entry of address values in one field. Here, if it is detected in step S1001 that the key selected by the user is not any key of the touch keys 902, then the CPU 301 advances to step S1004.

As described above, it is regulated with respect to the notation of an IPv6 address that four or less address values (namely, numerical digits from "0" through "9" and alphabetical digits from "A" through "F") can be entered in one field. Furthermore, it is regulated with respect to the notation of an IPv6 address that a colon(s) (":" or "::") is required after four digits.

Accordingly, if it is detected in step S1001 that the user has selected a key of the touch keys 902, then in step S1003, the CPU 301 detects whether a last field of the entered IPv6 address already includes four digits. That is, in the case of entering a one-byte digit, the CPU 301 refers to last four bytes in the digits describing the entered IPv6 address to detect whether all the four bytes are address values.

If it is detected in step S1003 that the last field of the entered IPv6 address already includes four digits, that is, if all the last four bytes are address values, (Yes in step S1003), then the CPU 301 advances to step S1007. In step S1007, the CPU 301 notifies an error to the user.

On the other hand, if it is detected in step S1003 that the last field of the entered IPv6 address includes less than four digits, that is, if it is detected that the last four-byte field of the entered IPv6 address includes at least one value other than an address value, (No in step S1003), then the CPU 301 advances to step S1004.

In step S1004, the CPU 301 detects whether a colon(s) (":" or "::") has been entered in the input field 901. Here, if it is detected in step S1001 that the user has not selected either the touch key 903 or the touch key 904, then the CPU 301 advances to step S1005.

An IPv6 address cannot include three or more continuous colons (":"). Accordingly, if it is detected in step S1001 that the user has selected the touch key 903, then in step S1004, the CPU 301 detects whether two colons ("::") have been entered in a last portion of a digit string of the entered IPv6 address. That is, in step S1004, the CPU 301 refers to last two bytes of the digit string describing the entered IPv6 address to detect whether the last two bytes are both colons ("::").

If it is detected in step S1004 that two colons have been continuously entered, that is, the last two bytes of the digit string describing the entered IPv6 address are colons ("::"), (Yes in step S1004), then the CPU 301 advances to step S1007. In step S1007, the CPU 301 notifies an error to the user.

On the other hand, if it is detected in step S1004 that colons have not been continuously entered, that is, the last two bytes of the entered IPv6 address include at least one value other than a colon (":"), (No in step S1004), then the CPU 301 advances to step S1005.

If it is detected in step S1001 that the user selected the touch key 904, then in step S1004, the CPU 301 detects whether a last digit describing the entered IPv6 address is a colon (":"). That is, the CPU 301 refers to a last one digit of the digit string describing the entered IPv6 address to detect whether a last one digit of the digit string is a colon (":").

If it is detected in step S1004 that the last one digit of the digit string is a colon (":"), that is, if the last one byte is a colon (":"), (Yes in step S1004), then the CPU 301 advances to step S1007. In step S1007, the CPU 301 notifies an error to the user.

On the other hand, if it is detected in step S1004 that the last one digit of the digit string describing the entered IPv6 address is not a colon (":"), that is, if the last one byte is not a colon (":"), (No in step S1004), then the CPU 301 advances to step S1005.

In step S1005, the CPU 301 detects whether colons ("::") have been used twice or more in the entered IPv6 address. Here, if it is detected in step S1001 that the user has not selected either the touch key 903 or the touch key 904, then the CPU 301 advances to step S1006.

On the other hand, if it is detected in step S1001 that the user has selected the touch key 903, then the CPU 301 refers to the digits describing the entered IPv6 address to detect whether the digits already include colons ("::") and a last digit of the entered IPv6 address is a colon (":").

If it is detected in step S1005 that the digits already include colons ("::") and a last digit of the entered IPv6 address is a colon (":") (Yes in step S1005), then the CPU 301 advances to step S1007. In step S1007, the CPU 301 notifies an error to the user. On the other hand, if it is detected in step S1005 that no colon pair ("::") have been used or that the digits already include a colon pair ("::") but the last digit of the entered IPv6 address is not a colon (":") (No in step S1005), then the CPU 301 advances to step S1006.

If it is detected in step S1001 that the user selected the touch key 904, then the CPU 301 refers to the digit string describing the entered IPv6 address to detect whether a colon pair ("::") has already been used. If a colon pair ("::") has already been used (Yes in step S1005), then the CPU 301 advances to step S1007. In step S1007, the CPU 301 notifies an error to the user. On the other hand, if no colon pair ("::") has been used (No in step S1005), then the CPU 301 advances to step S1006.

In step S1006, the CPU 301 writes an address value or a mark corresponding to the key that the user is permitted to select, in a memory (e.g., a specific area of the RAM 302) as one part of the digit string describing the entered IPv6 address.

In step S1007, the CPU 301 displays a message indicating that the user is not permitted to select the key. That is, the CPU 301 displays a predetermined message on the LCD display unit 313 of the operation unit 312. Then, the CPU 301 returns to step S1001 and waits in a loop for the user to select a key.

Figure 11:
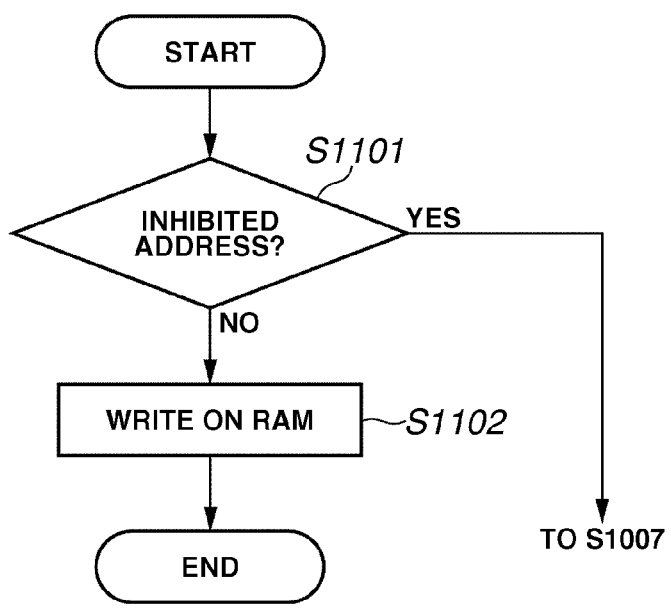
FIG. 11 is a flow chart illustrating processing performed by a network apparatus according to the first exemplary embodiment of the present invention.

FIG. 11 is a flow chart illustrating processing for detecting an operation inhibited in entering an IPv6 address according to the present embodiment.

When the user selects the touch key 909, the user has completely entered an IPv6 address. However, if the entered IPv6 address is an inhibited IPv6 address, the CPU 301 issues a warning message to the user.

Referring to FIG. 11, if it is detected in step S1001 (FIG. 10) that the user has selected the touch key 909, then in step S1101, the CPU 301 detects whether the entered IPv6 address is permitted. The RAM 302 of the MFP 101 stores an IPv6 address not permitted as a manual IPv6 address.

Accordingly, in step S1101, the CPU 301 collates the IPv6 address entered by the user with the IPv6 address not permitted as a manual IPv6 address and stored on the RAM 302. If it is detected in step S1101 that the IPv6 address entered by the user and the IPv6 address not permitted as a manual IPv6 address match with each other, the CPU 301 advances to step S1007 (FIG. 10). Here, for example, a multicast address and an address described with only zeros are inhibited address.

On the other hand, if it is detected in step S1101 that the IPv6 address entered by the user and the IPv6 address not permitted as a manual IPv6 address do not match with each other, then the CPU 301 advances to step S1102. In step S1102, the CPU 301 writes a digit string describing the manual IPv6 address in a specific area of the RAM 302, and then the CPU 301 ends the processing.

Now, a second exemplary embodiment of the present invention will be described. In the present embodiment, when a user, in entering an IPv6 address, selects a touch key corresponding to the colon pair ("::"), the CPU 301 checks the entered IPv6 address. If it is detected that a colon pair ("::") has already been used, the entered value is accepted as "0".

Figure 12:
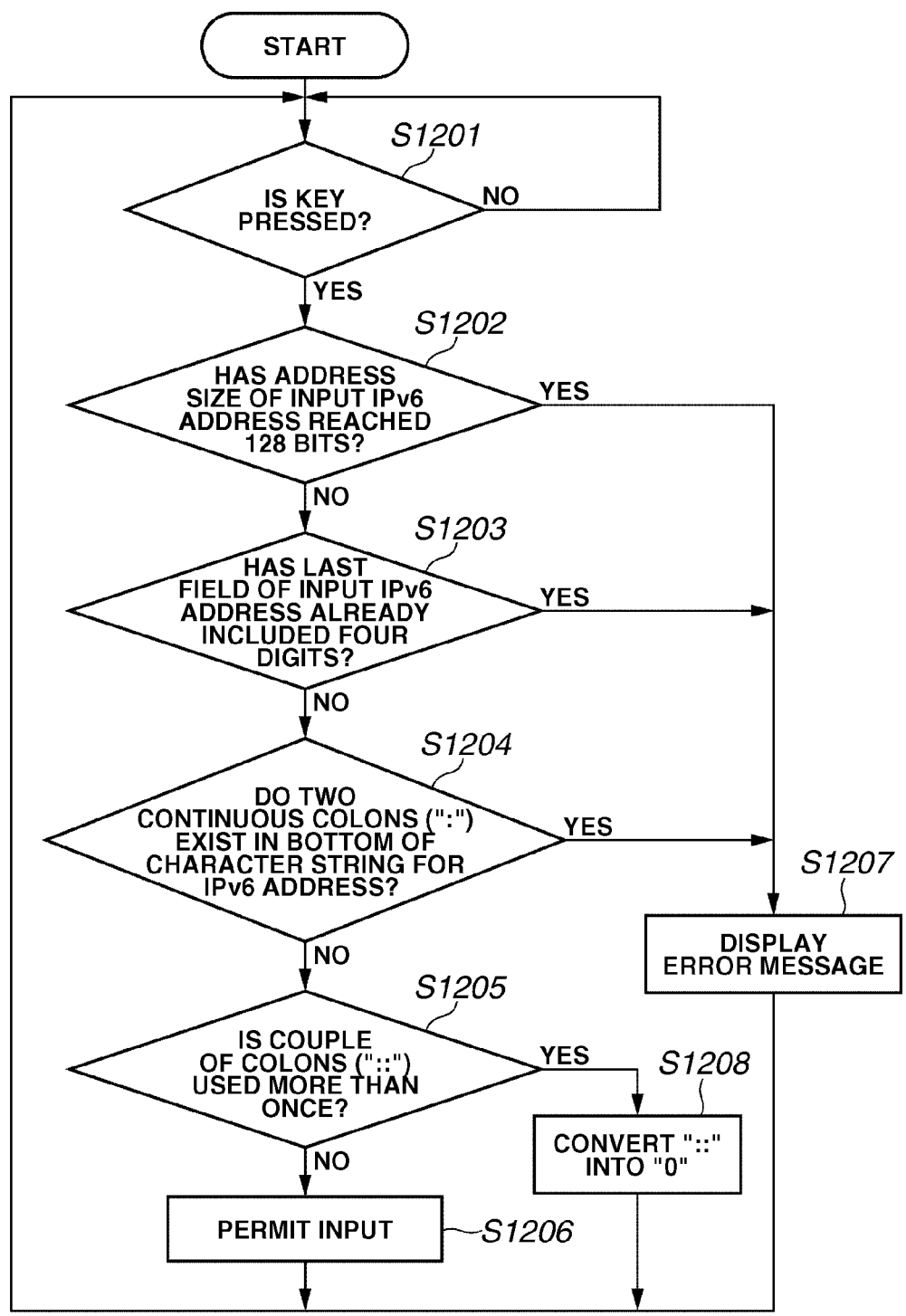
FIG. 12 is a flow chart illustrating processing performed by a network apparatus according to a second exemplary embodiment of the present invention.

FIG. 12 is a flow chart illustrating processing for detecting an operation inhibited in entering an IPv6 address according to the present embodiment.

When the user selects either the touch keys 902, the touch key 903, or the touch key 904, desired digits are entered and the entered digits are displayed in the input field 901 as described above. If the entered digit string does not conform to a specific regulation for entering an IPv6 address, the CPU 301 issues a warning message to the user indicating that the current operation is inhibited.

Referring to FIG. 12, after the processing for detecting an inhibited operation starts, in step S1201, the CPU 301 waits until the user selects a desired key. If it is detected in step S1201 that either of the touch keys 902, the touch key 903, or the touch key 904 has been selected by the user (Yes in step S1201), then the CPU 301 advances to the steps described below to evaluate an entered digit.

In step S1202, the CPU 301 evaluates an address size. That is, in step S1202, the CPU 301 detects whether an address size of the entered IPv6 address has already reached 128 bits.

As described above, an IPv6 address is 128 bits long. Accordingly, if it is detected in step S1202 that the address size of the entered IPv6 address has already reached 128 bits (Yes in step S1202), then the CPU 301 advances to step S1207. In step S1207, the CPU 301 notifies an error to the user. On the other hand, if the address size of the entered IPv6 address has not yet reached 128 bits (No in step S1202), then the CPU 301 advances to step S1203.

In step S1203, the CPU 301 evaluates continuous entry of address values in one field. If it is detected in step S1201 that the key selected by the user is not any key of the touch keys 902, then the CPU 301 advances to step S1204.

As described above, it is regulated with respect to the notation of an IPv6 address that four or less address values (namely, numerical digits from "0" through "9" and alphabetical digits from "A" through "F") can be entered in one field. Furthermore, a colon(s) (":" or "::") is required after four digits.

Accordingly, if it is detected in step S1201 that the user has selected a key of the touch keys 902, then in step S1203, the CPU 301 detects whether a last field of the entered IPv6 address already includes four digits. That is, in the case of entering a one-byte digit, the CPU 301 refers to last four bytes in the digits describing the entered IPv6 address to detect whether all the four bytes are address values.

If the last field of the entered IPv6 address already includes four digits, that is, if all the last four bytes are address values, (Yes in step S1203), then the CPU 301 advances to step S1207. In step S1207, the CPU 301 notifies an error to the user. On the other hand, if it is detected in step S1203 that the last field of the entered IPv6 address includes less than four digits, that is, if the last four-byte field of the entered IPv6 address includes at least one value other than an address value, (No in step S1203), then the CPU 301 advances to step S1204.

In step S1204, the CPU 301 detects whether a colon(s) (":" or "::") has been entered in the input field 901. Here, if it is detected in step S1201 that the user has not selected either the touch key 903 or the touch key 904, then the CPU 301 advances to step S1205.

According to the notation rule of an IPv6 address, up to two continuous colons ("::") can be entered, but it is inhibited that three or more continuous colons are used. Accordingly, if it is detected in step S1201 that the user has selected the touch key 903, then in step S1204, the CPU 301 detects whether two colons ("::") have been entered in a last portion of the entered IPv6 address. That is, in step S1204, the CPU 301 refers to last two bytes of a digit string describing the entered IPv6 address to detect whether the last two bytes are colons ("::").

If it is detected in step S1204 that two colons have been continuously entered, that is, the last two bytes of the digit string describing the entered IPv6 address are both colons ("::"), (Yes in step S1204), then the CPU 301 advances to step S1207. In step S1207, the CPU 301 notifies an error to the user. On the other hand, if it is detected in step S1204 that colons have not been continuously entered, that is, the last two bytes of the entered IPv6 address include at least one value other than a colon (":"), (No in step S1204), then the CPU 301 advances to step S1205.

If it is detected in step S1201 that the user has selected the touch key 904, then in step S1204, the CPU 301 detects whether a last digit describing the entered IPv6 address is a colon (":"). That is, the CPU 301 refers to a last one digit of the digit string describing the entered IPv6 address to detect whether a last one digit of the digit string is a colon (":").

If the last one digit of the digit string is a colon (":"), that is, if the last one byte is a colon (":"), (Yes in step S1204), then the CPU 301 advances to step S1207. In step S1207, the CPU 301 notifies an error to the user. On the other hand, if it is detected in step S1204 that the last one digit of the digit string is not a colon (":"), that is, if the last one byte is not a colon (":"), (No in step S1204), then the CPU 301 advances to step S1205.

In step S1205, the CPU 301 detects whether colons ("::") have been used twice or more in the entered IPv6 address. If it is detected in step S1201 that the user has not selected either the touch key 903 or the touch key 904, then the CPU 301 advances to step S1206.

On the other hand, if the user has selected the touch key 903, then the CPU 301 refers to the digits describing the entered IPv6 address to detect whether the digits already include colons ("::") and a last digit of the entered IPv6 address is a colon (":").

If it is detected in step S1205 that the digits already include colons ("::") and a last digit of the entered IPv6 address is a colon (":") (Yes in step S1205), then the CPU 301 advances to step S1208. On the other hand, if no colon pair ("::") have been used or that the digits already include a colon pair ("::") but the last digit of the entered IPv6 address is not a colon (":") (No in step S1205), then the CPU 301 advances to step S1206.

If it is detected in step S1201 that the user has selected the touch key 904, then the CPU 301 refers to the digit string describing the entered IPv6 address to detect whether a colon pair ("::") has already been used. If a colon pair ("::") has already been used (Yes in step S1205), then the CPU 301 advances to step S1208. On the other hand, if no colon pair ("::") has been used (No in step S1205), then the CPU 301 advances to step S1206.

In step S1208, the CPU 301 writes "0" in a memory (e.g., in a specific area of the RAM 302 of the MFP 101) instead of the colon pair which is being repeatedly entered, as one part of the digit string describing the entered IPv6 address.

In step S1206, the CPU 301 writes in a memory (e.g., in a specific area of the RAM 302) an address value or a mark corresponding to the key that the user is permitted to press as one part of the digit string describing the entered IPv6 address.

In step S1207, the CPU 301 displays a message indicating that the user is inhibited from selecting the key. That is, the CPU 301 displays a predetermined message on the LCD display unit 313 of the operation unit 312. Then, the CPU 301 returns to step S1201 and waits in a loop for the user to select a key.

A third exemplary embodiment of the present invention will now be described. In the present embodiment, when a user, in entering an IPv6 address, selects a touch key corresponding to the colon pair ("::") after entering digits for all 128 bits, the CPU 301 checks the entered IPv6 address. If it is detected that a portion of the digit string that can be replaced with a colon pair ("::") exists, the CPU 301 replaces the portion with colons ("::").

Figure 13:
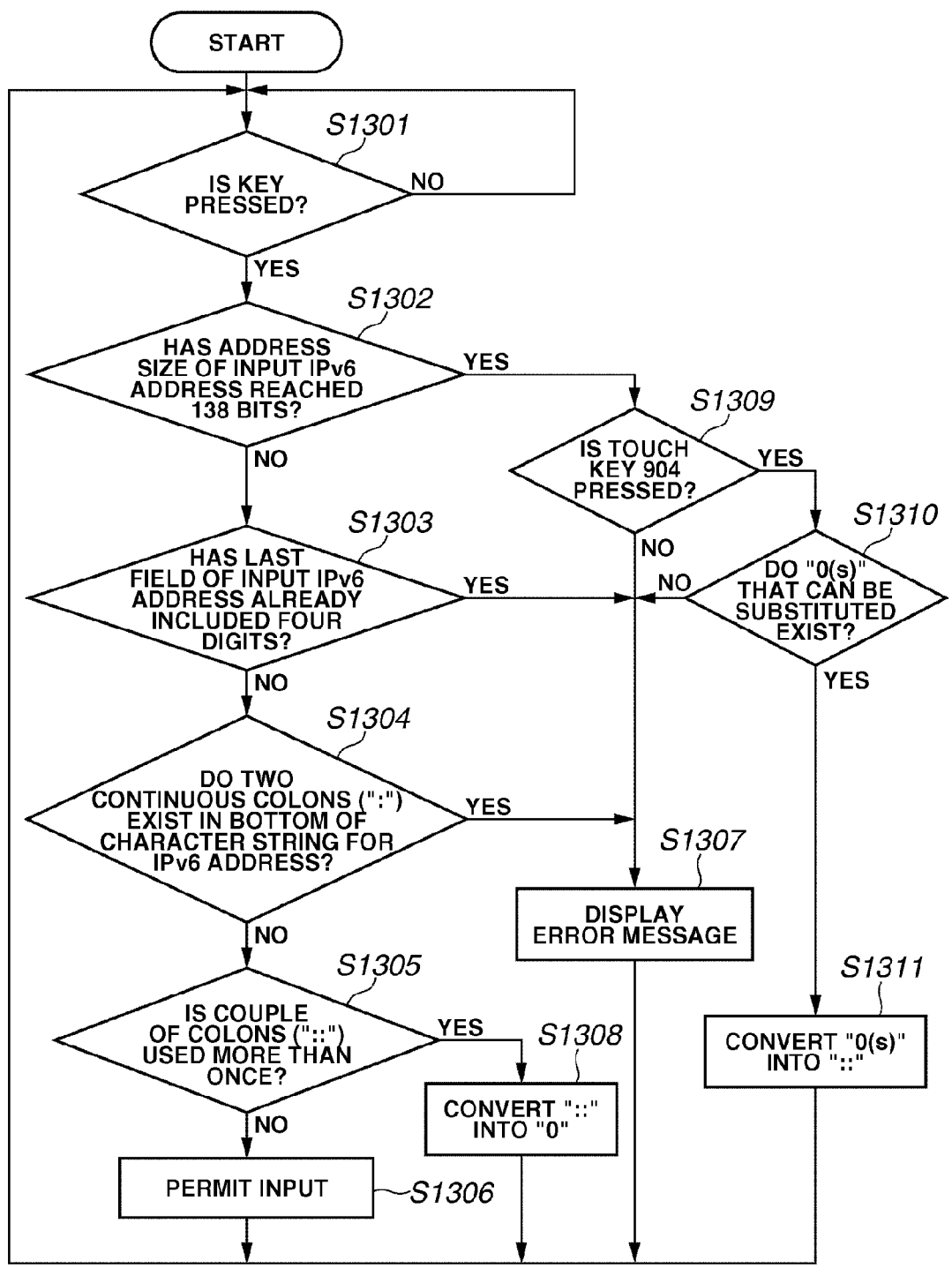
FIG. 13 is a flow chart illustrating processing performed by a network apparatus according to the second exemplary embodiment of the present invention.

FIG. 13 is a flow chart illustrating processing for detecting an operation inhibited in entering an IPv6 address according to the present embodiment.

When the user selects either the touch keys 902, the touch key 903, or the touch key 904, desired digits are entered and the entered digits are displayed in the input field 901 as described above. If the entered digit string does not conform to a specific regulation for entering an IPv6 address, the CPU 301 issues a warning message to the user indicating that the current operation is inhibited.

Referring to FIG. 13, after the processing for detecting an inhibited operation starts, in step S1301, the CPU 301 waits until the user selects a desired key. If it is detected in step S1301 that either the touch keys 902, the touch key 903, or the touch key 904 has been selected by the user (Yes in step S1301), then the CPU 301 advances to the steps described below to evaluate an entered digit.

In step S1302, the CPU 301 evaluates an address size. That is, in step S1302, the CPU 301 detects whether an address size of the entered IPv6 address has already reached 128 bits.

As described above, an IPv6 address is 128 bits long. Accordingly, if it is detected in step S1302 that the address size of the entered IPv6 address has already reached 128 bits (Yes in step S1302), then the CPU 301 advances to step S1309.

In step S1309, the CPU 301 detects whether the user has selected the touch key 904. If it is detected in step S1309 that the user has selected the touch key 904 (Yes in step S1309), then the CPU 301 advances to step S1310. On the other hand, if the user selects either the touch keys 902 or the touch key 903 (No in step S1309), then the CPU 301 advances to step S1307. In step S1307, the CPU 301 notifies an error to the user.

In step S1310, the CPU 301 refers to the entered IPv6 address to detect whether zeros entered over continuous 32 or more bits exist in the entered IPv6 address separated in the unit of 16 bits.

If it is detected in step S1310 that no zeros entered over continuous 32 or more bits exist in the entered IPv6 address separated in the unit of 16 bits (No in step S1310), then the CPU 301 advances to step S1307. In step S1307, the CPU 301 notifies an error to the user. On the other hand, if it is detected in step S1310 that zeros entered over continuous 32 or more bits exist in the entered IPv6 address separated in the unit of 16 bits (Yes in step S1310), then the CPU 301 advances to step S1311.

In step S1311, the CPU 301 replaces the portion of the continuous zeros detected in step S1310 with colons ("::"). The digit string describing the entered IPv6 address has been stored in a specific area of the RAM 302. The CPU 301 deletes the zeros in the digit string of the entered IPv6 address to replace the continuous zeros with colons ("::").

If a plurality of portions including continuous zeros is found in step S1309, then the CPU 301 replaces the portion having a largest number of zero digits, with colons ("::"). Then, the CPU 301 waits for the user to select a key.

In step S1302, the CPU 301 evaluates an address size. That is, in step S1302, the CPU 301 detects whether an address size of the entered IPv6 address has already reached 128 bits. If the address size of the entered IPv6 address has not yet reached 128 bits (No in step S1302), then the CPU 301 advances to step S1303.

In step S1303, the CPU 301 evaluates continuous entry of address values in one field. Here, if it is detected that the key selected by the user is not any key of the touch keys 902, then the CPU 301 advances to step S1304.

As described above, it is regulated with respect to the notation of an IPv6 address that four or less address values (namely, numerical digits from "0" through "9" and alphabetical digits from "A" through "F") can be entered in one field. Furthermore, it is regulated with respect to the notation of an IPv6 address that a colon(s) (":" or "::") is required after four digits.

Accordingly, if it is detected in step S1301 that the user has selected a key of the touch keys 902, then in step S1303, the CPU 301 detects whether a last field of the entered IPv6 address already includes four digits. That is, in the case of entering a one-byte digit, the CPU 301 refers to last four bytes in the digits describing the entered IPv6 address to detect whether all the four bytes are address values.

If it is detected in step S1303 that the last field of the entered IPv6 address already includes four digits, that is, if all the last four bytes are address values (Yes in step S1303), then the CPU 301 advances to step S1307. In step S1307, the CPU 301 notifies an error to the user. On the other hand, if it is detected in step S1303 that the last field of the entered IPv6 address includes less than four digits, that is, if the last four-byte field of the entered IPv6 address includes at least one value other than an address value (No in step S1303), then the CPU 301 advances to step S1304.

In step S1304, the CPU 301 detects whether a colon(s) (":" or "::") has been entered. Here, if the user has not selected either the touch key 903 or the touch key 904, then the CPU 301 advances to step S1305.

In an IPv6 address, the number of continuous colons (":") is limited to three. Accordingly, if the user selects the touch key 903, then in step S1304, the CPU 301 detects whether two colons ("::") have been entered in a last portion of the entered IPv6 address. That is, in step S1304, the CPU 301 refers to last two bytes of a digit string describing the entered IPv6 address to detect whether the last two bytes are colons ("::").

If it is detected in step S1304 that two colons have been continuously entered, that is, if the last two bytes of the digit string describing the entered IPv6 address are both colons (":") (Yes in step S1304), then the CPU 301 advances to step S1307. In step S1307, the CPU 301 notifies an error to the user. On the other hand, if it is detected in step S1304 that colons have not been continuously entered, that is, the last two bytes of the entered IPv6 address include at least one value other than a colon (":") (No in step S1304), then the CPU 301 advances to step S1305 to permit inputting of a colon (":").

If it is detected in step S1301 that the user has selected the touch key 904, then in step S1304, the CPU 301 detects whether a last digit describing the entered IPv6 address is a colon (":"). That is, the CPU 301 refers to a last one byte of the digit string describing the entered IPv6 address to detect whether a last one digit of the digit string describing the entered IPv6 address is a colon (":").

If it is detected in step S1304 that the last one digit of the digit string describing the entered IPv6 address is a colon (":"), that is, if the last one byte is a colon (":") (Yes in step S1304), then the CPU 301 advances to step S1307. In step S1307, the CPU 301 notifies an error to the user. On the other hand, if it is detected in step S1304 that the last one digit of the digit string describing the entered IPv6 address is not a colon (":"), that is, if the last one byte is not a colon (":") (No in step S1304), then the CPU 301 advances to step S1305. In step S1305, the CPU 301 detects whether colons ("::") have been used twice or more in the entered IPv6 address.

If it is detected in step S1301 that the user has not selected either the touch key 903 or the touch key 904, then the CPU 301 advances to step S1306. On the other hand, if the user has selected the touch key 903, then the CPU 301 refers to the digits describing the entered IPv6 address to detect whether the digits already include colons ("::") and a last digit of the entered IPv6 address is a colon (":").

If it is detected in step S1305 that the digits already include colons ("::") and a last digit of the entered IPv6 address is a colon (":") (Yes in step S1305), then the CPU 301 advances to step S1308. On the other hand, if no colon pair ("::") have been used or the digits already include a colon pair ("::") but the last digit of the entered IPv6 address is not a colon (":") (No in step S1305), then the CPU 301 advances to step S1306.

If it is detected in step S1301 that the user has selected the touch key 904, then the CPU 301 refers to the digit string describing the entered IPv6 address to detect whether a colon pair ("::") has already been used. If a colon pair ("::") has already been used (Yes in step S1305), then the CPU 301 advances to step S1308. On the other hand, if it is detected in step S1305 that no colon pair ("::") has been used (No in step S1305), then the CPU 301 advances to step S1306.

In step S1308, the CPU 301 writes "0" in a memory (e.g., in a specific area of the RAM 302 of the MFP 101) instead of the colon pair which is being repeatedly entered, as one part of the digit string describing the entered IPv6 address.

In step S1306, the CPU 301 writes an address value or a mark corresponding to the key that the user is permitted to press, in a memory (e.g., in a specific area of the RAM 302) as one part of the digit string describing the entered IPv6 address.

In step S1307, the CPU 301 displays a message indicating that the user is not permitted to select the key. That is, the CPU 301 displays a predetermined message on the LCD display unit 313 of the operation unit 312. Then, the CPU 301 returns to step S1301 and waits in a loop for the user to select a key.

The exemplary embodiments of the present invention has been described with reference to the drawings. However, the network apparatus to be set is not limited to the MFP 101. For example, the PC 102 or the PC 104 can be used as the network apparatus. In this case, a user enters a numerical value, an alphabetical value, and a mark included in an IPv6 address via the PC 102 or the PC 104.

According to the above-described exemplary embodiments of the present invention, in setting an IPv6 address to a network apparatus, the user can enter an IP address including an abbreviation mark with a simple method.

The present invention can be applied to a system or an apparatus including a plurality of devices (e.g., a computer, an interface device, a reader, and a printer) and to an apparatus that includes one device. In addition, the present invention can also be achieved by providing the system or the device with a storage medium which stores program code of software implementing the functions of the embodiments and by reading and executing the program code stored in the storage medium with a computer of the system or the device (a CPU or an MPU). In this case, the program code itself, which is read from the storage medium, implements the functions of the exemplary embodiments mentioned above, and accordingly, the storage medium storing the program code constitutes the present invention.

As the storage medium for supplying such program code, a floppy disk, a hard disk, an optical disk, a magneto-optical disk (MO), a CD-ROM, a CD-recordable (CD-R), a CD-rewritable (CD-RW), a magnetic tape, a nonvolatile memory card, a ROM, and a digital versatile disk (DVD (DVD-recordable (DVD-R), DVD-rewritable (DVD-RW)), for example, can be used.

In this case, the program code itself, which is read from the storage medium, implements the function of the embodiments mentioned above, and accordingly, the storage medium storing the program code constitutes the present invention.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk. The functions of the above embodiments can also be implemented by dividing the program code into a plurality of files and downloading each divided file from different web sites. That is, a World Wide Web (WWW) server and a file transfer protocol (ftp) server for allowing a plurality of users to download the program file for implementing the functional processing constitute the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet; and by executing and installing in the computer the encrypted program code by using the key information.

In addition, the functions according to the embodiments described above can be implemented not only by executing the program code read by the computer, but also implemented by the processing in which an OS (operating system) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-244833 filed Sep. 8, 2006, which is hereby incorporated by reference herein in its entirety.

What is claimed is:

1. A network apparatus comprising:
a network interface unit configured to perform communication using an IP address; and
a display unit configured to display input keys for inputting alphabetical characters that can be used for an IP address without displaying input keys for inputting alphabetical characters that cannot be used for the IP address,
wherein the display unit includes a touch panel, and the input keys for inputting the alphabetical characters and numeric characters are displayed on an input screen as touch keys.

2. The network apparatus according to claim 1, further comprising a storage unit configured to store the IP address input as an IP address of the network apparatus.

3. The network apparatus according to claim 1, wherein the IP address is an IPv6 address.

4. A network apparatus comprising:
a network interface unit configured to perform communication with an external apparatus; and
a display unit configured to display input keys for inputting alphabetical characters that can be used for representation in hexadecimal notation without displaying input keys for inputting alphabetical characters that cannot be used for representation in the hexadecimal notation, in accordance with the instruction from the instruction unit,
wherein the display unit includes a touch panel, and the input keys for inputting the alphabetical characters and numeric characters are displayed on an input screen as touch keys.

5. The network apparatus according to claim 4, further comprising a storage configured to store the IP address input as an IP address of the network apparatus.

6. The network apparatus according to claim 4, wherein the IP address is an IPv6 address.

7. A control method for a network apparatus configured to perform communication using an IP address, the method comprising:
receiving an instruction to display input keys; and
displaying the input keys, on a display unit, for inputting alphabetical characters that can be used for the IP address without displaying input keys for inputting alphabetical characters that cannot be used for the IP address, in accordance with the instruction,
wherein the display unit includes a touch panel, and the input keys for inputting the alphabetical characters and numeric characters are displayed as touch keys.

8. A control method for a network apparatus configured to perform communication with an external apparatus, the method comprising:
receiving an instruction to display input keys; and
displaying the input keys, on a display unit, for inputting alphabetical characters that can be used for representation in hexadecimal notation without displaying input keys for inputting alphabetical characters that cannot be used for representation in the hexadecimal notation, in accordance with the instruction,
wherein the display unit includes a touch panel, and the input keys for inputting the alphabetical characters and numeric characters are displayed as touch keys.

9. A non-transitory computer-readable storage medium storing a program for causing a computer to execute the control method of a network apparatus, comprising:
receiving an instruction to display input keys; and
displaying the input keys, on a display unit, for inputting alphabetical characters that can be used for the IP address without displaying input keys for inputting alphabetical characters that cannot be used for the IP address, in accordance with the instruction,
wherein the display unit includes a touch panel, and the input keys for inputting the alphabetical characters and numeric characters are displayed as touch keys.

10. A non-transitory computer-readable storage medium storing a program for causing a computer to execute the control method of a network apparatus, comprising:
receiving an instruction to display input keys; and
displaying the input keys, on a display unit, for inputting alphabetical characters that can be used for representation in hexadecimal notation without displaying input keys for inputting alphabetical characters that cannot be used for representation in the hexadecimal notation, in accordance with the instruction, wherein the display unit includes a touch panel, and the input keys for inputting the alphabetical characters and numeric characters are displayed as touch keys.

\* \* \* \* \*